United States Patent
Lee et al.

(10) Patent No.: US 6,460,125 B2
(45) Date of Patent: Oct. 1, 2002

(54) DYNAMIC MEMORY CLOCK CONTROL SYSTEM AND METHOD

(75) Inventors: Keith Sk Lee, Markham; David Sinclair, North York, both of (CA)

(73) Assignee: ATI Technologies, Inc., Thornhill (CA)

( * ) Notice: Subject to any disclaimer, the term of this patent is extended or adjusted under 35 U.S.C. 154(b) by 0 days.

(21) Appl. No.: 09/130,746

(22) Filed: Aug. 7, 1998

(51) Int. Cl.⁷ .............................................. C06F 12/00
(52) U.S. Cl. ...................... 711/167; 711/150; 711/151; 711/158; 711/167; 713/501; 713/322; 713/323; 713/502; 365/227
(58) Field of Search ................................ 711/167, 158, 711/151, 150; 335/556; 713/501, 322–323, 502; 365/227; 710/25

(56) References Cited

U.S. PATENT DOCUMENTS

| | | | | |
|---|---|---|---|---|
| 5,781,768 A | * | 7/1998 | Jones, Jr. .................... | 713/501 |
| 5,804,749 A | * | 9/1998 | Shirakawa et al. ........... | 84/601 |
| 6,073,223 A | * | 6/2000 | McAllister et al. ......... | 711/167 |
| 6,079,025 A | * | 6/2000 | Fung ........................... | 713/323 |
| 6,112,310 A | * | 8/2000 | Jun et al. .................... | 713/501 |

* cited by examiner

*Primary Examiner*—Do Hyun Yoo
*Assistant Examiner*—Mehdi Namazi
(74) *Attorney, Agent, or Firm*—Vedder, Price, Kaufman & Kammholz

(57) ABSTRACT

A memory clock control system and method facilitates power reduction on a dynamic basis by detecting memory access request loading from a number of memory access devices, such as video and graphics engines. Based on the detected memory access requirements, the system and method adaptively varies a memory clock frequency in response to determining the desired memory usage at a given point in time. The memory clock is varied based on the priority of a given memory access engine, such that the clock is kept or increased to a higher rate for high priority engines such as real-time processing engines to facilitate high performance video capture.

21 Claims, 7 Drawing Sheets

DYNAMIC MEMORY CLOCK CONTROL SYSTEM AND METHOD

BACKGROUND OF THE INVENTION

The invention relates generally to circuits and methods for reducing power consumption for electronic circuits, and more particularly to circuits and methods that control a memory clock and/or memory controller to reduce power consumption.

Portable electronic devices such as notebook computers, personal organizers, portable telecommunication equipment and other electronic devices consume much power during their display mode. By way of example, graphics control chips for laptop computers may be integrated circuits having dynamic ram (DRAM) on the same die as the memory controller and other video and graphics processors. As shown in FIG. 1 for example, a conventional type of graphics control chip 100 may include a number of memory access request circuits (or access request engines) such as a video capture engine 102, a two dimensional and three dimensional drawing engine 104, a display engine 106, a video playback engine 108, a host processor 109, onboard DRAM 110 serving as the memory, a memory controller 112 and a phase lock loop circuit (PLL) 114 for generating a memory clock. As known in the art, each engine 102–108 may have another clock, other than the memory clock, creating a clock boundary 116. Graphics control chips typically also include another phase lock loop circuit 118 for generating a clock for a display device (or devices) such as a CRT 120a that may plug into the laptop computer or an LCD display 120b that is mounted to the laptop computer. A central processing unit (CPU) of the computer 122 interfaces with the graphics chip and other peripheral devices as known in the art. A laptop computer or a portable device may include a TV tuner 124, as part of a multimedia package, that sends video information 126 to the video capture engine 102 for eventual display on LCD display 120b after being stored in the memory 110.

With chips such as graphics controller chips, the many graphic engines 102-108 attempt to access the memory 110 to perform their necessary operations. However only one of the graphic engines can access the memory 110 at a given time. Some of the display operations require real-time processing, such as video capture operation, display operation and video playback, so that real-time display can occur on the LCD display 120b. For example, where the TV tuner is applying video to the video capture engine 102, the video should be processed in real-time to facilitate display in real-time which is necessary, for example, for live performances or when the TV tuner is providing live feed. Hence this engine has a higher priority over, for example, a 2D or 3D drawing engine 104 which may be slightly delayed and still provide the user with high performance on display times. In conventional systems, that employ video capture engines for example, the memory clock frequency is set at the highest possible frequency to ensure suitable graphic controller performance. However, this results in a higher power dissipation which can degrade the overall system performance of a portable electronic device and fail to conserve battery power. If the memory clock is set to a lower speed, the real-time operations may not process information fast enough and suffer unnecessarily at the expense of reduced power consumption.

A problem arises with such devices since power consumption and thermal dissipation need to minimized for portable devices without unnecessarily sacrificing operational performance. The power dissipation of a graphics control chip and other integrated circuits is typically related to the frequency of the memory clock. Systems such as those shown in FIG. 1 typically have a fixed memory clock 128 which can be manually changed by the user through a graphical user interface but is typically factory set upon initialization and often does not change.

Consequently, there exists a need for a dynamic power reduction circuit that can reduce power consumption and power dissipation without unnecessarily degrading system performance. It would be advantageous, if such a system could detect memory access demand and automatically adjust memory clock frequency accordingly to facilitate power reduction and increase display capabilities during proper times.

DETAILED DESCRIPTION OF THE INVENTION

A memory clock control system and method facilitates power reduction on a dynamic basis by detecting memory access request loading from a number of memory access devices, such as video and graphics engines. Based on the detected memory access requirements, the system and method adaptively varies a memory clock frequency in response to determining the desired memory usage at a given point in time. The memory clock is varied based on the priority of a given memory access engine, such that the clock is kept or increased to a higher rate for high priority engines such as real-time processing engines to facilitate high performance video capture. Conversely, if a lower priority graphics engine desires access to the memory controller, the system evaluates the memory access demand and reduces the memory clock to reduce power consumption and power dissipation. In one embodiment, a duration of non-access for a given memory access engine is used to determine whether the memory clock frequency should be varied.

Figure 1:
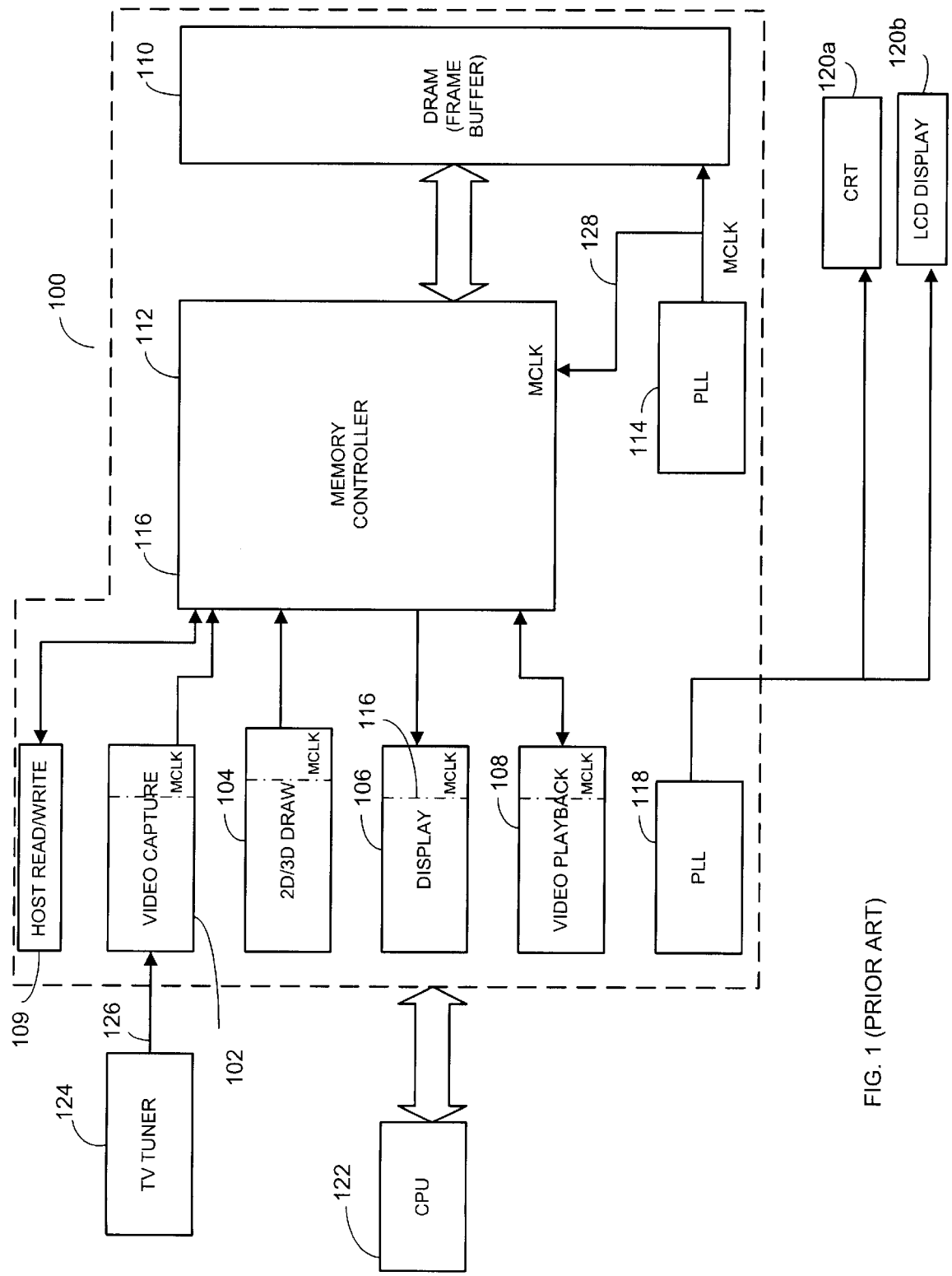
FIG. 1 is a block diagram of a prior art graphics control chip.
Figure 2:
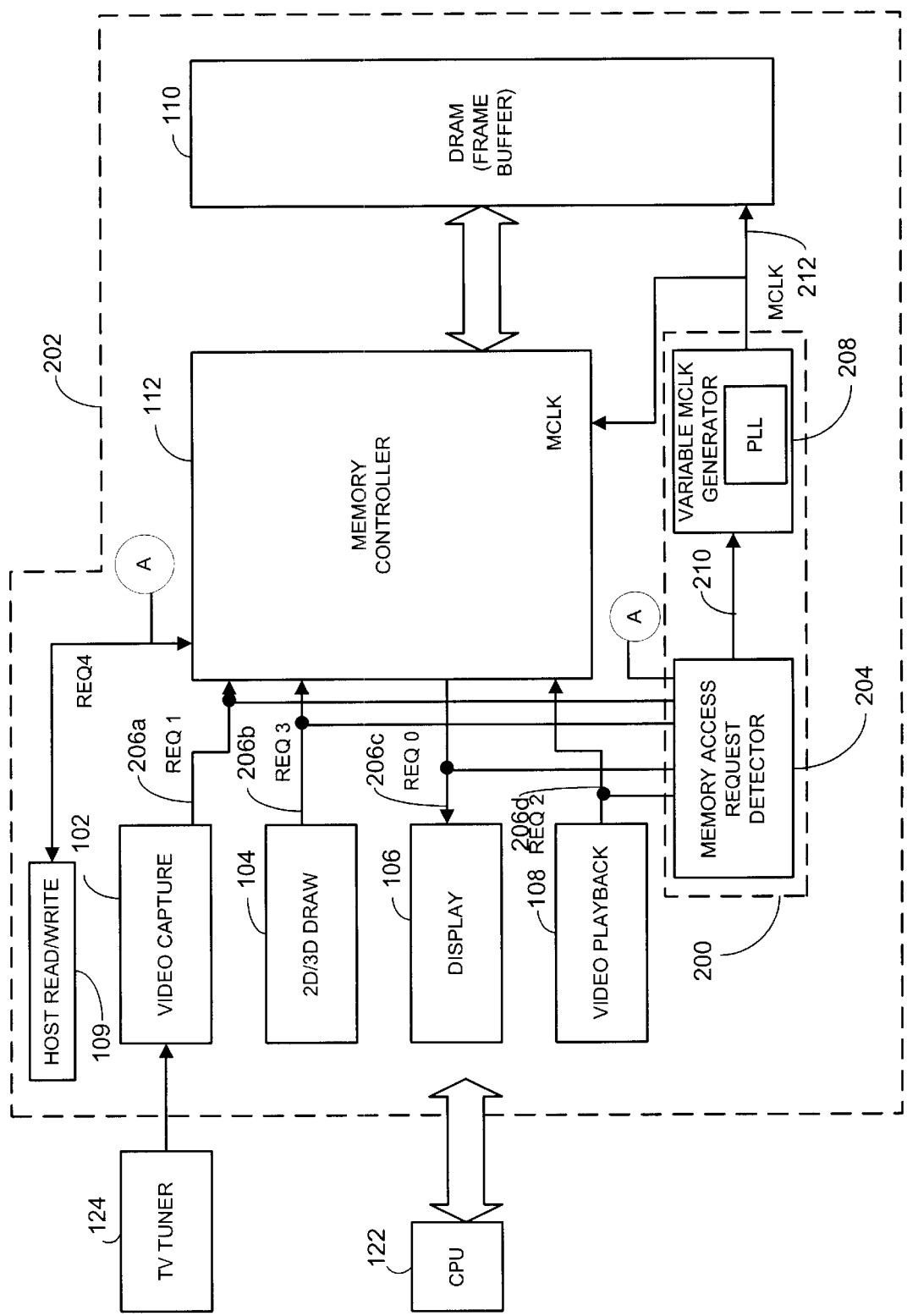
FIG. 2 is a block diagram of an embodiment of a graphics control chip employing an adaptive memory clock control system in accordance with one embodiment of the invention.

FIG. 2 shows a memory clock control system 200 incorporated on a graphics controller chip 202 containing both memory 110 (DRAM) and memory access request circuits such as video and graphics engines. The memory 110 and the memory controller 112 are on a common chip or die. However, it will be recognized that any of the memory access request engines or circuits may be on separate dies or discrete circuits if desired.

The memory clock control system 200 includes a memory access request detector 204 for detecting memory access request data 206a–206e. The memory access request data 206a–206e (REQ 0 through REQ 4) are request signals (memory access traffic channels) generated by the various graphic memory access engines 102-108 as shown. The memory access request data 206a–206e serves as a request to the memory controller 112 requesting access (i.e., data) to the memory 110. The memory access request detector 204 may be any suitable digital logic such as a programmed digital signal processor or other suitable circuitry, software or any suitable combination thereof. The memory access request detector 204 detects the memory access request data 206a–206e for a plurality of memory access channels to determine the desired memory access at any given time.

The memory clock control system 200 also includes a variable memory clock generator 208 that receives a variable memory clock control signal 210 to adaptively vary the memory clock signal 212 in response to determining the desired memory usage from the memory access channels represented by the request data 206a–206e. The variable memory clock generator 208 includes a programmable phase lock loop (PLL) or any other suitable variable clock generator. For example, multiple clock sources can be selected through a multiplexing circuit or a fixed clock can be divided down or multiplied accordingly.

The memory access request detector 204 detects an increase or reduction in memory access usage by analyzing the request data 206a–206e. For example, the memory access request detector analyzes the request data to see which engine is accessing memory, and for how long. The 2D/3D drawing engine is typically given lower priority such that if the display engine requires data for a display frame, and the memory clock is set a slower speed, the memory clock control system 200 increases the memory clock for the display engine. If for example, the detector detects that only the 2D/3D engine is requesting memory access, the clock speed is reduced if it was previously set at a high speed. Also, if for example, only the display engine is active but requires a bandwidth of data that allows a lower clock speed, the clock will be decreased. The variable memory clock generator 208 generates the variable memory clock signal 212 for the memory controller 112 and the memory 110. Also, the variable clock generator 208 may generate other clocks if desired.

The memory clock control system 200 reduces the power consumption of the memory controller 112 and the DRAM or memory 110 by reducing the memory clock frequency when appropriate, and also improves performance by automatically adapting to memory access demands by increasing the memory clock during the periods when high bandwidth demands are required from the memory and memory controller, such as during memory access requests from real time processing engines. Hence the memory clock MCLK signal 212 is dynamically varied based on graphic and image engine usage. The memory clock control system 200 detects which graphic or image engine is operational and varies the memory clock in response to the duration of non-access of memory to decrease power during non-access conditions. Hence the memory clock control system is a type of activity based detector. If desired, the system may include a graphic user interface to allow a user to select priority of the engines.

Figure 3:
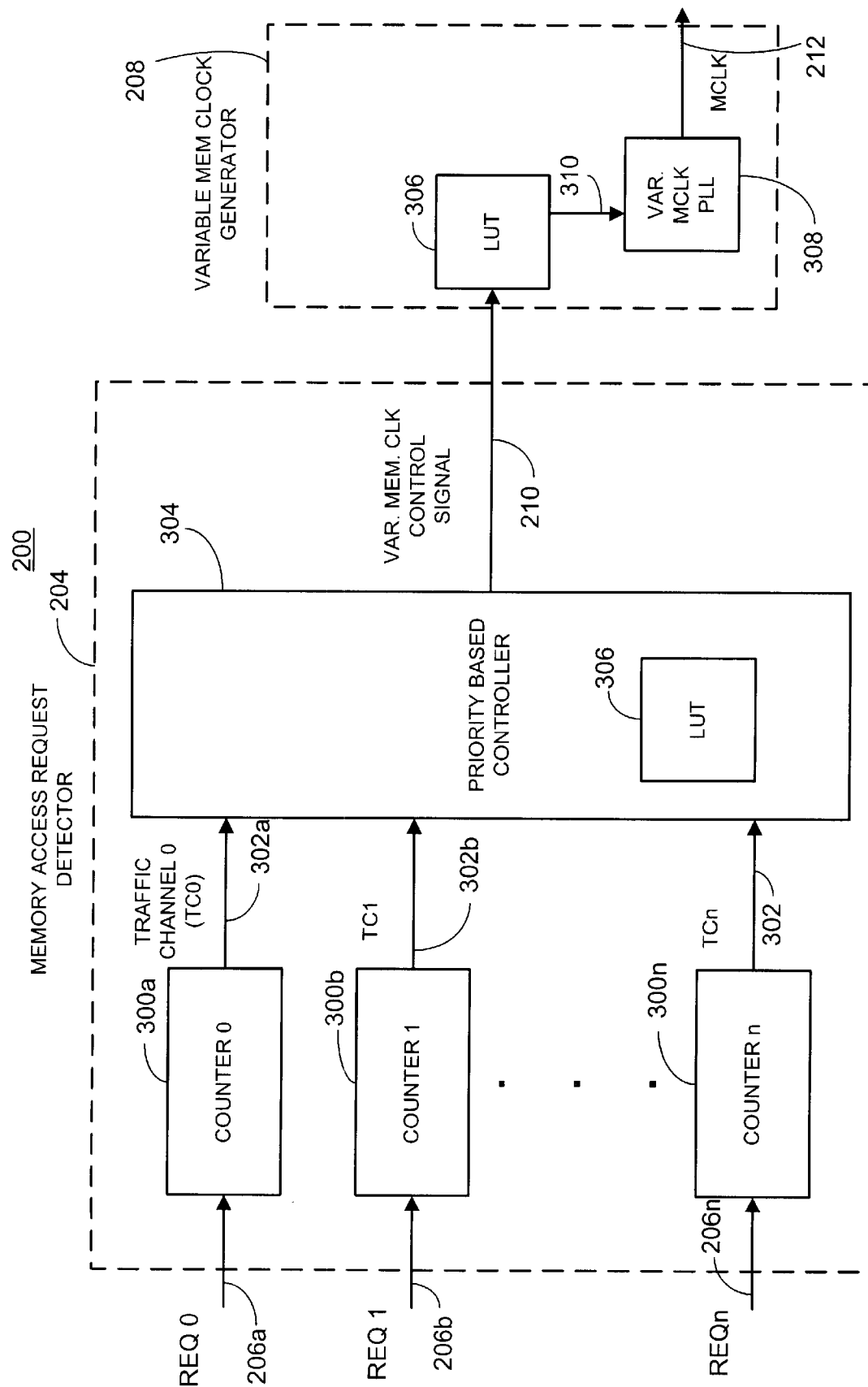
FIG. 3 is a block diagram depicting one example of a memory access request data detector and a variable memory clock generator in accordance with one embodiment of the invention.

FIG. 3 shows the memory access request detector 204 including counters 300a–300n for determining a duration of non-access of memory by detecting non-access on a per access channel basis. By way of example, the mechanism for determining a duration of non-access of memory may be a counter, as shown, or any other suitable duration detection mechanism. Each counter 300a–300n receives the request data 206a–206n and increments when no request is detected. The clock may detect a request on each clock cycle, each frame or other suitable time. When the counter times out, the count indicates whether the particular memory access traffic channel (and hence the associated memory access request engine) has been dormant for a long enough period of time to warrant a reduction in MCLK frequency to reduce power consumption. Alternatively, a counter can be decremented when a request is present or any suitable mechanism may be used to detect a non-access condition. The time out period for each counter may be preprogrammed by a display driver to an optimal setting based on such factors as type of engine requesting memory access, display refresh rates and display resolution settings or other suitable criteria. Each of the non-access duration detectors 300a–300n outputs duration data 302a–302n for each traffic channel to a priority based controller 304. The priority based controller 304 may be any suitable processing device, such as a microprocessor or other suitable logic. The priority based controller 304 serves to prioritize among the received memory request data 206a–206n to selectively control the memory clock speed based on the priority of a given request channel. The priority based controller 304 adjusts the variable memory clock control signal 210 to a value to reduce power consumption in response to a detection of reduced memory access usage, or increases the memory clock speed in response to a detection of increased memory access usage to enhance graphics controller performance when usage requires.

The variable memory clock generator 208 includes memory 306 containing predetermined clock rate control data for controlling the variable memory clock 308. The memory 306 may include a lookup table (LUT) containing clock rate control values indexed by the value of the variable memory clock control signal. The predetermined clock rate control data 310 serves as the input to the variable memory clock 308. The variable memory clock 308 may be a phase lock loop circuit or any other suitable variable clock generation circuit, or a fixed PLL clock with multiple clock dividers which are selected using a controlled clock multiplexer. The memory clock is varied at a time when display corruption does not occur. This may be for example during vertical blanking periods or other suitable time.

Figure 4:
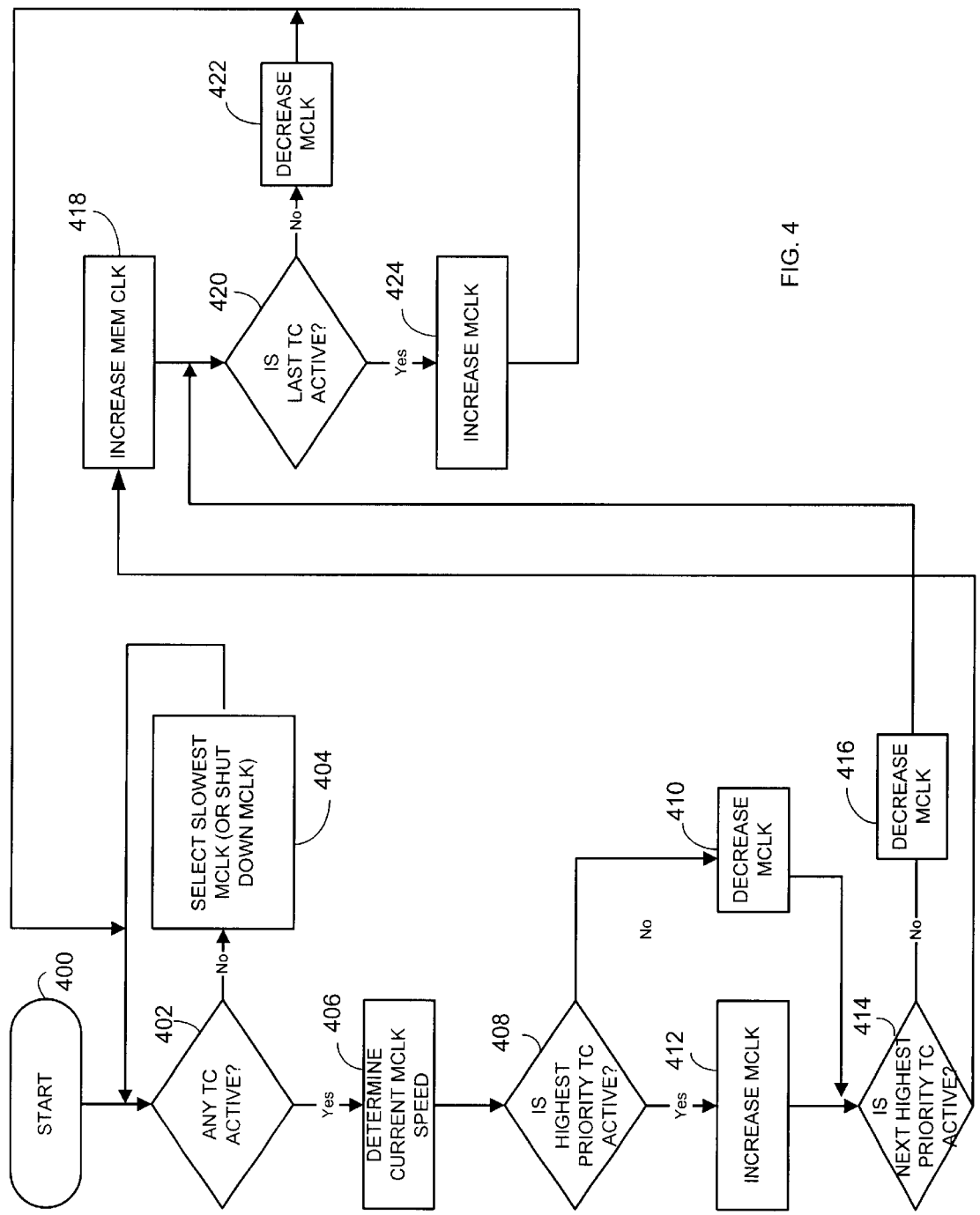
FIG. 4 is a flowchart illustrating one example of the operation of a memory access request data detector in accordance with one embodiment of the invention.

FIG. 4 shows an example of a method of operation for the priority based controller 304 which starts in block 400 by the priority based controller initializing the counter 308a–300n. The priority based controller 304 determines from the counter signals 302a–302n whether any traffic channel is active as shown in block 402. If no traffic channels are active, the priority based controller outputs a variable memory clock control signal 210 to select a slowest memory clock frequency as shown in block 404. If desired, the priority based controller 304 may generate a variable memory clock control signal 210 which shuts down the memory clock completely, if desired.

All of the traffic channels are evaluated at a given point in time to determine whether an adjustment to the memory clock is necessary. If for example, a traffic channel is detected to be active (e.g., requesting access to the memory) for a predetermined duration as indicated by the signals 302a–302n, the priority based controller 304 determines the current memory clock speed as shown in block 406 by looking at a copy of the lookup table 306 to determine the corresponding memory clock frequency corresponding to the last variable memory clock control signal 210 that was generated. As shown in block 408, the priority based controller 304 determines whether the highest priority channel is active. It determines this based on which counters are outputting data indicating non-access; those memory access engines that have not requested memory access for the time out period. As shown in FIG. 2, the display engine receives the highest priority hence REQ0 as assigned to the display engine 106. The priority based controller 304 is preprogrammed to assign the traffic channel associated with REQ0 as the highest priority request whereafter REQ1 is second priority and so on.

If the highest priority traffic channel is not active, the priority based controller 304 generates a variable memory clock control signal 210 to decrease the memory clock 212 as shown in block 410 to reduce power consumption by the memory controller and memory if the memory clock is not already reduced to the desired amount. It may decrease the memory clock to the next predetermined frequency as set in the look up table or may if desired, reduce it more than one step depending upon its determination of which priority channel is active. If the highest priority channel is active and the current setting for the MCLK signal 212 is not at the highest frequency, the priority based controller 304 will increase the memory clock by generating a suitable variable memory clock control signal 210 so that performance is enhanced to suitably accommodate memory accesses by the highest priority engine. This is shown in block 412. Hence the system increases the memory clock speed in response to a detection of an increase in memory access usage.

The priority based controller 304 then continues to check whether the next lowest priority traffic channel is active as shown in block 414. If it is not, the priority based controller 304 will generate a variable memory clock control signal 210 to decrease the memory clock as shown in block 416. Since only one engine can access the memory at any given point, the priority based controller 304 will decrease the memory clock since it had previously either detected a higher priority access or sufficient non access by the high priority engine indicating that the memory clock is operating at a speed unnecessarily high. If the next highest priority traffic channel is active, the priority based controller 304 will increase the memory clock as shown in block 418. The priority based controller 304 continues the analysis to determine if the last priority traffic channel is active as shown in block 420. If it is not active, indicating no access to the memory is occurring by any of the memory access engines, the priority based controller 304 will decrease the memory clock frequency as shown in block 422. If the lowest priority traffic channel is active, the priority based controller 304 will increase the memory clock by a step as shown in block 424. The process continues on an ongoing basis during the operation of the graphics controller chip.

Figure 5:
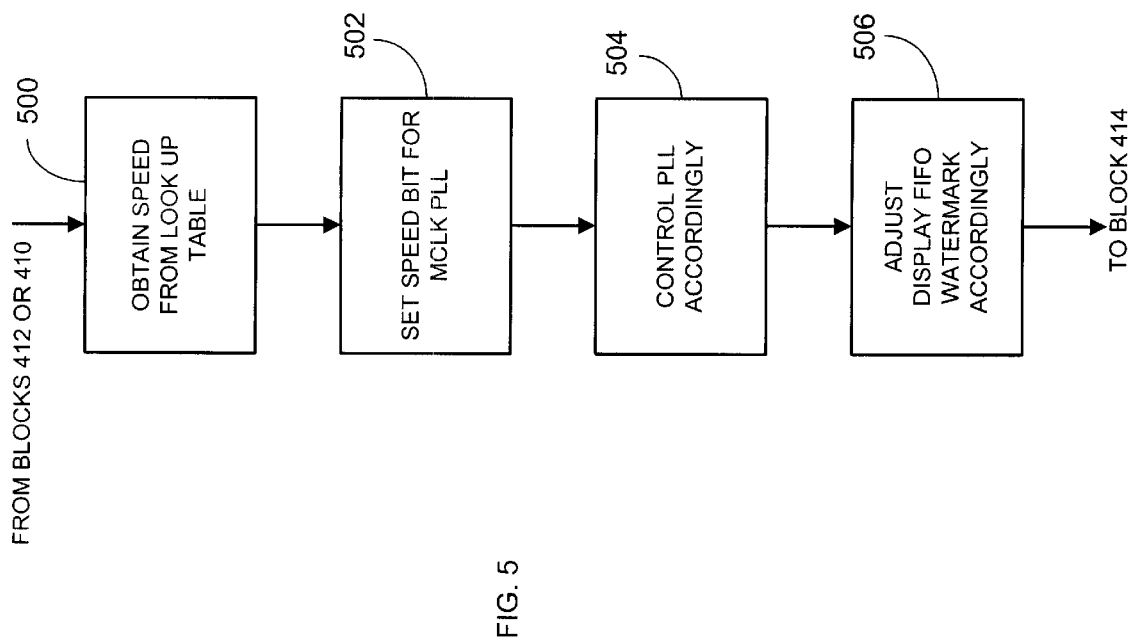
FIG. 5 is a flowchart generally depicting one method for varying a memory clock in response to determining the desired memory usage in accordance with one embodiment of the invention.

FIG. 5 shows one embodiment of a method for controlling the memory clock which may include for example, increasing the memory clock frequency or decreasing the memory clock frequency as previously described with reference to FIG. 4. In operation, the variable memory clock generator 208 obtains the current memory clock speed from the lookup table 306 and sets the speed bit for the variable memory clock 308 as shown in blocks 500 and 502. The variable memory clock then controls the memory clock frequency based on which speed bit is set. This is shown in block 504. Either the variable memory clock generator or the memory access request detector generates another control signal which varies the display FIFO watermark, or other suitable mechanism for controlling the display FIFO, so that the display FIFO is filled sooner so that overflows or underflows do not occur in view of the new clock speed. This is shown in block 506. For example, if the clock speed is increased, the FIFO display watermark should be varied to avoid FIFO data overflows. It will be recognized that other memory clock speed related parameters must also be updated (e.g., refresh for memories).

Figure 6:
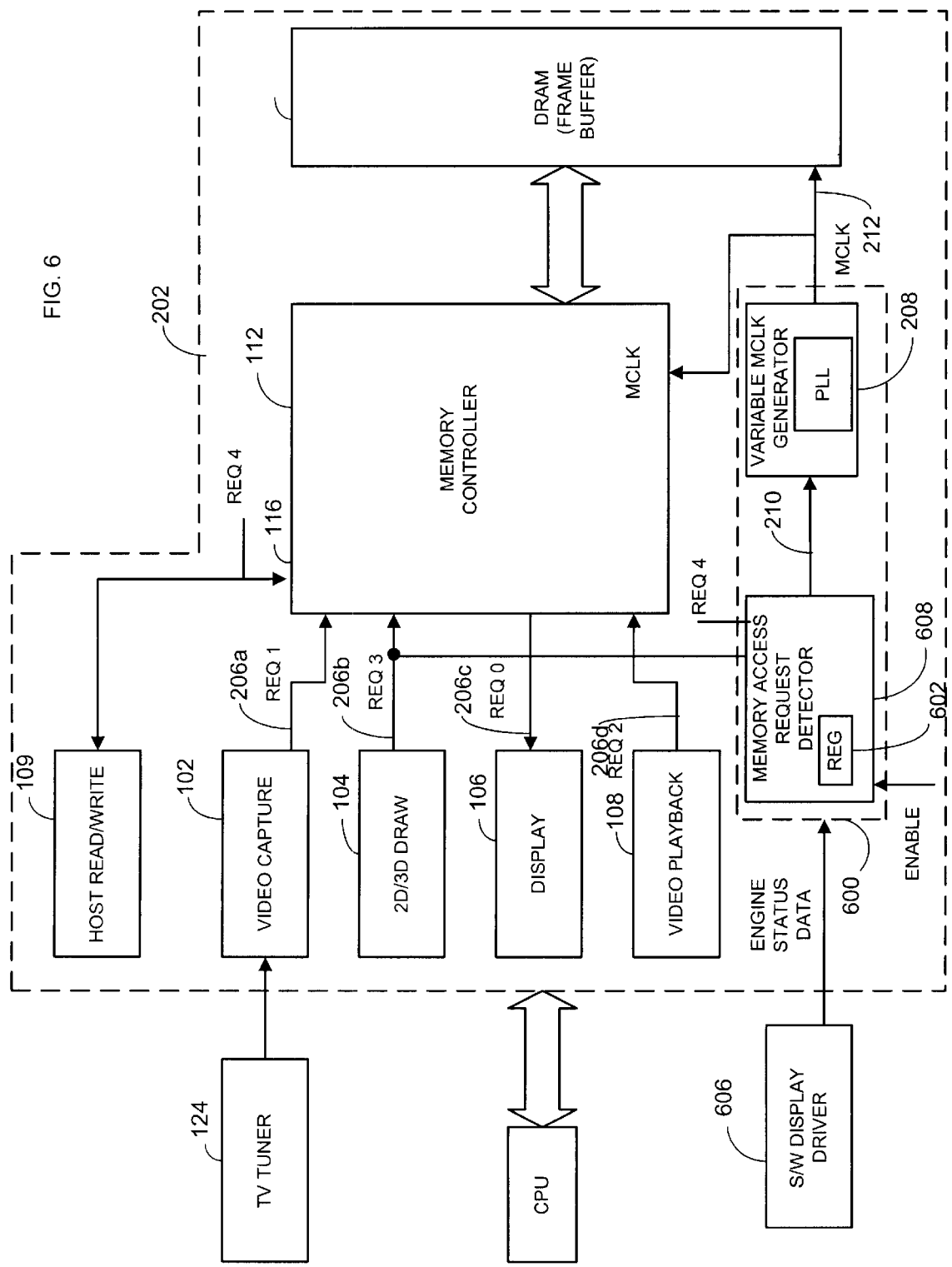
FIG. 6 is a block diagram illustrating another embodiment of an adaptive memory clock control system in accordance with the invention.

FIG. 6 shows another embodiment of a dynamic memory clock control system 600 having access to registers 602 containing status data 604 received from a display driver 606 or other suitable memory access loading determinator. The status data 604 represents whether a memory access engine is active and/or data representing whether to vary the memory clock based on request engine activity. As shown in this embodiment, the memory access request detector 608 evaluates only select memory access engines, such as the 2D/3D graphics engine 104. The display driver 606 determines whether other memory access engines are accessing memory and whether, if desired, the memory clock should be varied. The memory access request detector 608 also receives enable data, such as vertical blanking period data, to determine a suitable time to vary the memory clock to avoid display data corruption.

Figure 7:
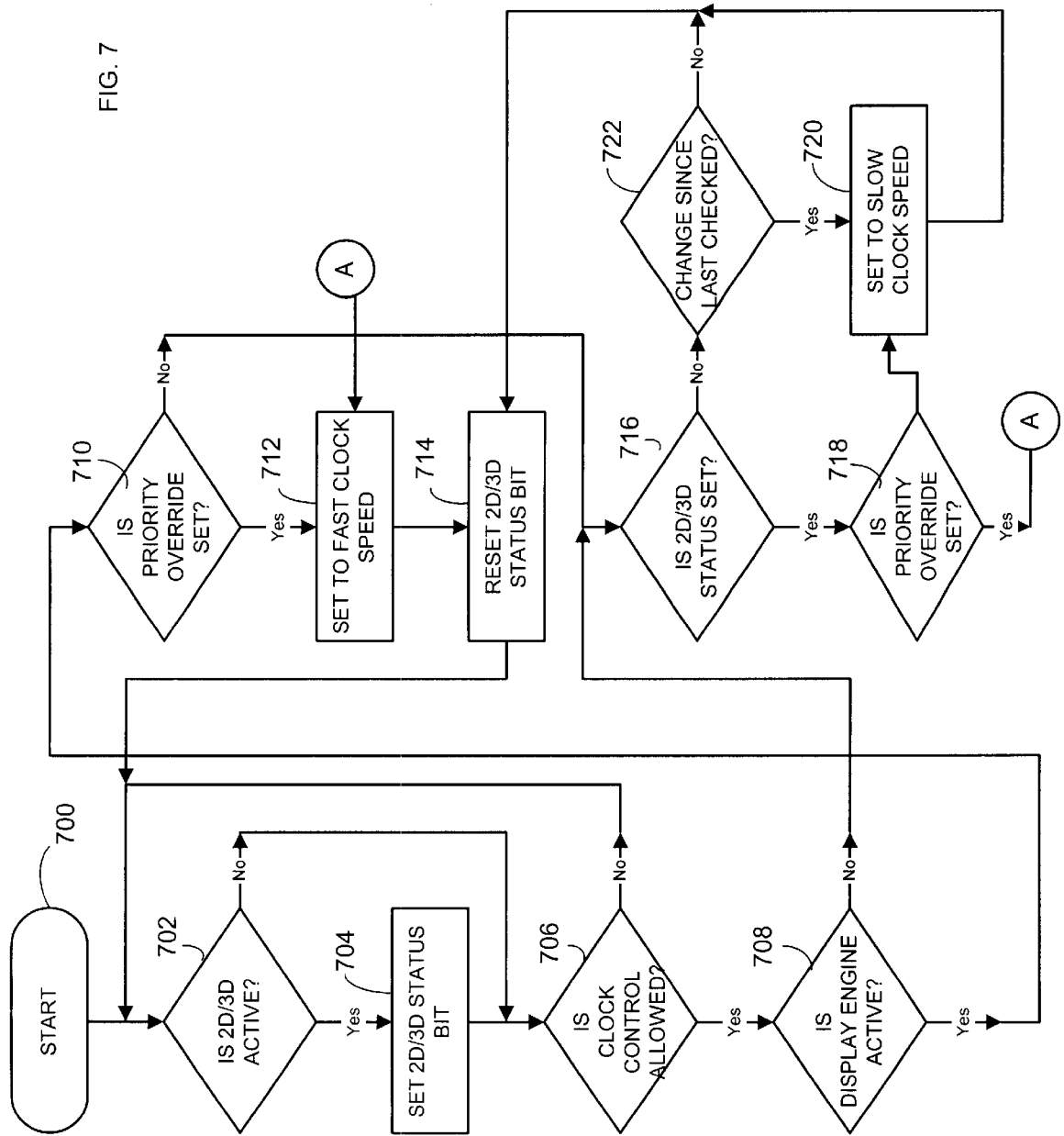
FIG. 7 is a flow chart illustrating an example of the operation of an adaptive memory clock control system as shown in FIG. 6.

FIG. 7 shows, by way of example, the operation of the dynamic memory clock control system 600 based on analysis of two memory access engines—the display engine and the 2D/3D graphics engine. The system starts as shown in block 700 by resetting any status bits or other control bits. As shown in block 702, the system determines whether the 2D/3D draw engine is active by monitoring the request data via a counter as previously described with respect FIG. 2. If the 2D/3D draw engine is active, a 2D/3D status bit is set, as shown in block 704. The system then checks the vertical blanking enable signal to determine whether memory clock control can occur. This is shown in block 706. In block 708, the system checks the registers 602 to determine whether the display engine active bit is set. If set, the display engine is performing a memory request.

If the display bit is set, the system checks if a priority override bit is set in the register 602, as shown in block 710. The display driver or control logic prioritizes among the received memory request data as desired. The priority bit may be set by the display driver if for example high bandwidth display modes occur. This overrides power reduction control. This can occur if the refresh rate is set at a high rate and display resolution is high, for example. If the priority bit is set, the system sets the clock speed to a higher speed as shown in block 712. The status bits are then reset, as indicated in block 714, and the process continues. Also if desired, a low display bandwidth may prevent the priority bit from being set, however, the system may increase the clock speed if the 2D/3D draw engine is active to provide better rendering performance and again reduce the memory clock speed when the draw engine is inactive.

Referring back to block 708, if the display bit is not active, or if active but the priority override bit is not set, the system determines if the 2D/3D engine is active as shown in block 716. If set, the system determines if the priority override bit is also set. This is shown in block 718. As shown in block 720, if the 2D/3D status bit is set and the priority override is not enabled, the system reduces the memory clock speed. If 2D/3D status bit is not set, indicating that neither the display engine is active nor the draw engine is active, the system determines whether a change in status has occurred since last checked, as shown in block 722. If a change has occurred, indicating that one engine had previously been active, the memory clock speed is reduced. The process continues to evaluate the memory request demand on a continuous basis and adjust the memory clock speed to reduce energy consumption when prudent.

It should be understood that the implementation of other variations and modifications of the invention in its various aspects will be apparent to those of ordinary skill in the art, and that the invention is not limited by the specific embodiments described. For example, any suitable control criteria may be used. It is therefore contemplated to cover by the present invention, any and all modifications, variations, or equivalents that fall within the spirit and scope of the basic underlying principles disclosed and claimed herein.

What is claimed is:

1. A memory clock control system for facilitating multiple memory access requests comprising:
   memory access request detector operative to detect a plurality of memory access channels to determine desired memory access based on a duration of non-access of memory on a per access channel basis; and
   a variable memory clock generator operatively coupled to the memory access request detector, and operative to vary a memory clock in response to determining a desired memory usage from the plurality of memory access channels.

2. The system of claim 1 wherein a counter responsive to the memory access request data determines the duration of non-acess of memory.

3. The system of claim 1 wherein the variable memory clock generator generates a variable memory clock control signal in response to an amount of desired memory access.

4. The system of claim 3 wherein the variable memory clock generator prioritizes among received memory request data to selectively control the memory clock speed.

5. The system of claim 1 wherein the variable memory clock generator decreases the memory clock speed to reduce power consumption in response to a detection of reduced memory access usage by the memory access request detector.

6. The system of claim 1 wherein the variable memory clock generator increases the memory clock speed in response to a detection of increased memory access usage by the memory access request detector.

7. The system of claim 1 further including memory containing predetermined clock rate control data for controlling the variable memory clock.

8. The system of claim 1 wherein the memory access requests are generated by a plurality of graphic engines in a graphics control system.

9. The system of claim 8 wherein the graphic engines include at least a real time display engine and a video capture engine.

10. A memory clock control system for facilitating multiple memory access requests comprising:
    memory access request detector operative to detect a plurality of memory access channels to determine desired memory access by determining at least one of a duration of non-access of memory, a reduction in access of memory, on a per access channel basis; and
    a variable memory clock generator operatively coupled to the memory access request detector and operative to vary a memory clock in response to determining a desired memory usage from the plurality of memory access channels and decreasing the memory clock speed to reduce power consumption in response to a detection of reduced memory access usage by the memory access request detector.

11. The system of claim 10 wherein the memory access request detector includes a counter responsive to the memory access request data.

12. The system of claim 10 wherein the variable memory clock generator generates a variable memory clock control signal in response to an amount of desired memory access.

13. The system of claim 12 wherein the variable memory clock generator prioritizes among received memory request data to selectively control the memory clock speed.

14. The system of claim 10 wherein the variable memory clock generator increases the memory clock speed in response to a detection of increased memory access usage by the memory access request detector.

15. The system of claim 10 further including memory containing predetermined clock rate control data for controlling the variable memory clock.

16. The system of claim 10 wherein the memory access requests are generated by a plurality of graphic engines in a graphics control system.

17. The system of claim 16 wherein the graphic engines include at least a real time display engine and a video capture engine.

18. A memory clock control system for facilitating multiple memory access requests comprising:
    means for detecting memory access request data for a plurality of memory access channels to determine desired memory access by determining a duration of non-access memory on a per access channel basis;
    a variable memory clock;
    memory containing predetermined clock rate control data for controlling the variable memory clock; and
    means, operatively coupled to the detecting means, the memory and the variable memory clock, for adaptively varying the memory clock in response to determining the desired memory usage from the plurality of memory access channels, including means for generating a variable memory clock control signal in response to an amount of desired memory access wherein the means for adaptively varying decreases the memory clock speed to reduce power consumption in response to a detection of reduced memory access usage by the means for detecting and increases the memory clock speed in response to a detection of an increase in memory access usage.

19. The memory clock control system of claim 18 wherein the memory stores a look-up table containing data representing differing memory clock speeds.

20. The memory clock control system of claim 19 wherein the means for detecting memory access request data includes a plurality of counters corresponding to a different memory access request channel.

21. A memory clock control system for facilitating multiple memory access requests comprising:
    a memory controller;
    a memory access request detector opposite to detect a plurality of memory access channels to determine desired memory access by determining at least one of a duration of non-access of memory and a reduction in access of memory, on a per access channel basis;
    wherein the memory access requests are generated by a plurality of graphics engines in a graphics control system, and wherein the plurality of graphics engines include at least a real time display engine and a video capture engine; and
    a variable memory clock generator operatively coupled to the memory access request detector and operative to vary a memory clock in response to determining a desired memory usage from the plurality of memory access channels and decreasing the memory clock speed to reduce power consumption in response to a detection of reduced memory access usage by the memory access request detector.

* * * * *